Jan. 5, 1926.
C. W. AIKEN
1,568,791
SOAP DRIER
Filed July 21, 1923    4 Sheets-Sheet 1
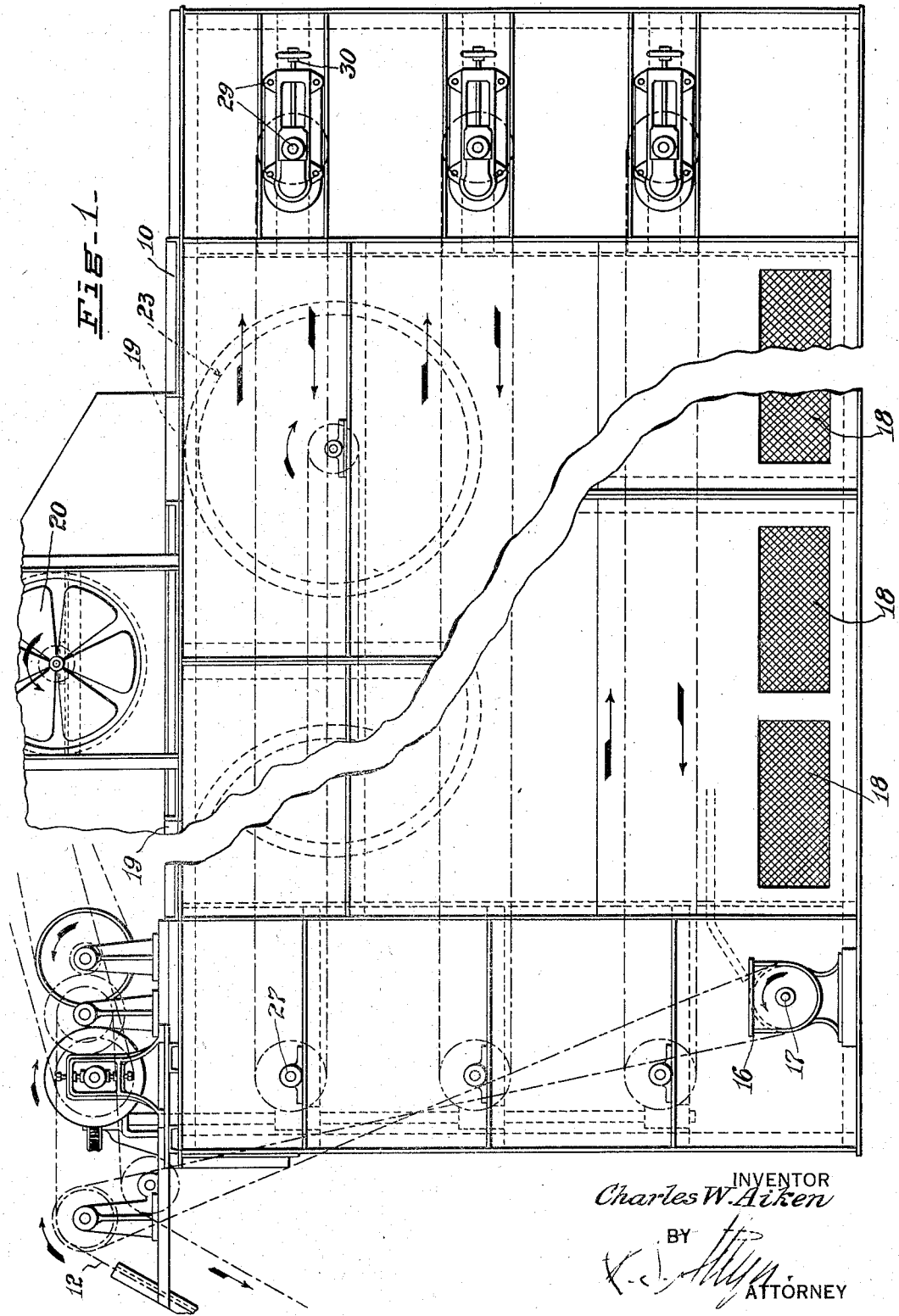
INVENTOR
Charles W. Aiken
BY
ATTORNEY

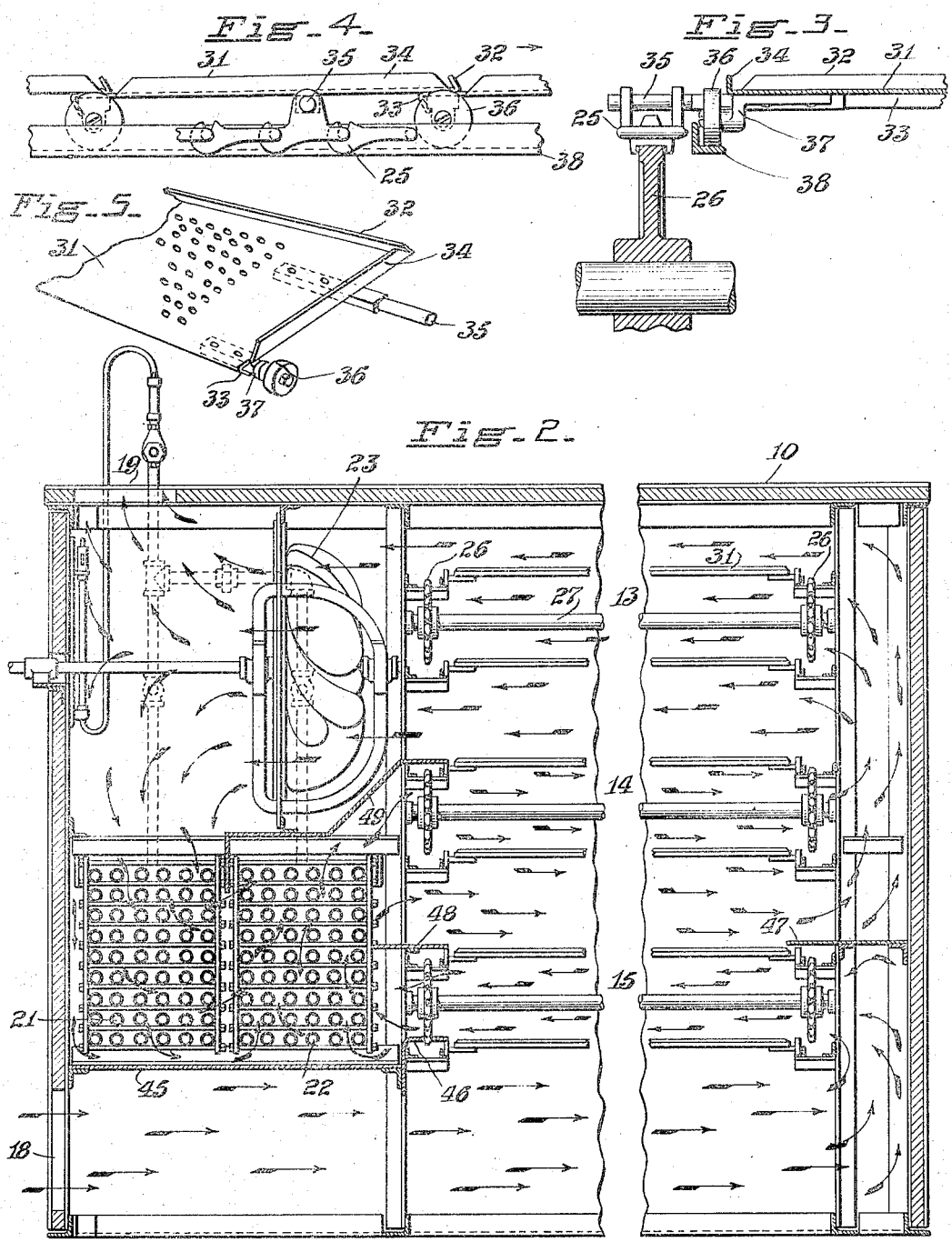

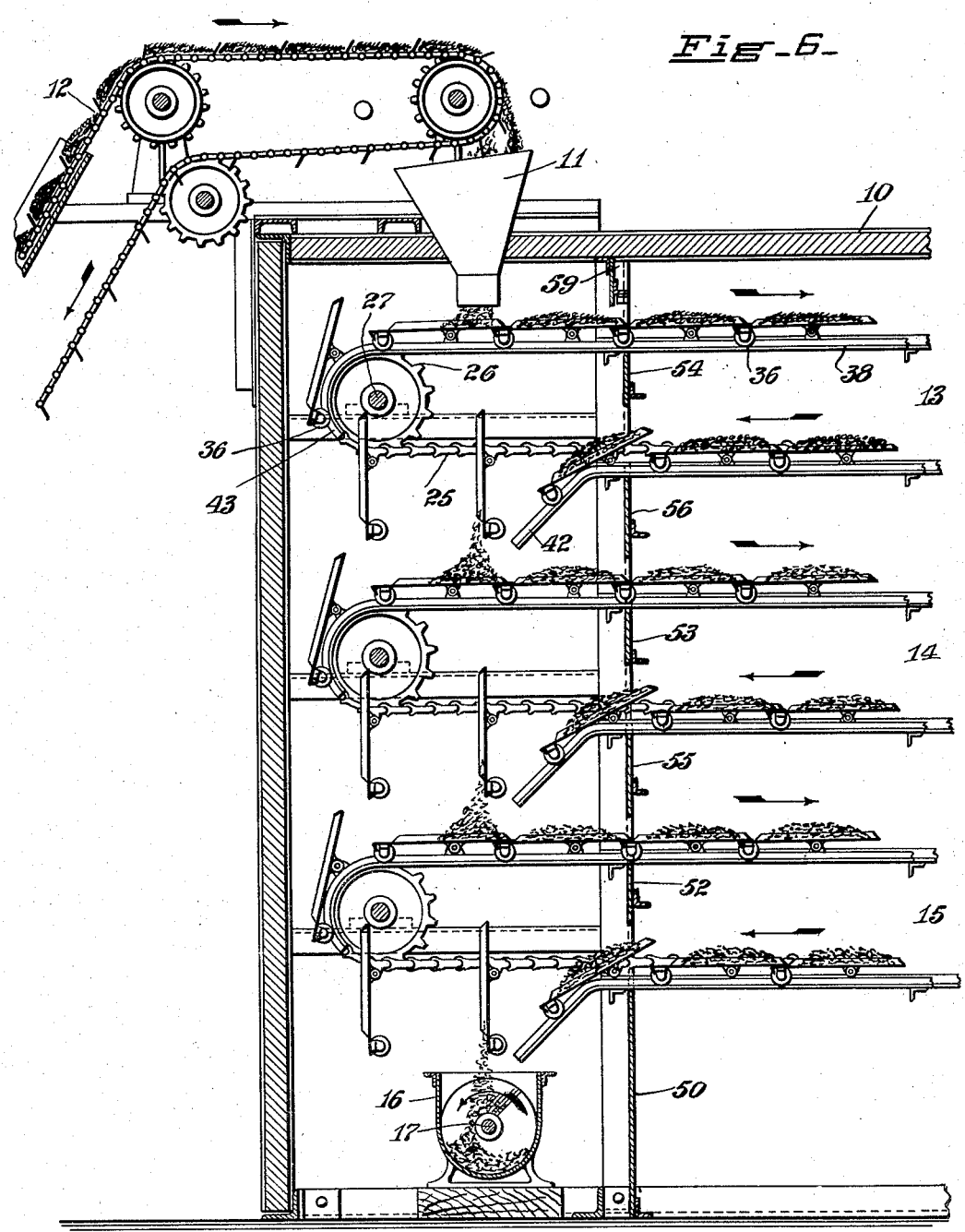

Jan. 5, 1926.

C. W. AIKEN 1,568,791

SOAP DRIER

Filed July 21, 1923   4 Sheets-Sheet 4

INVENTOR
Charles W. Aiken
BY
ATTORNEY

Patented Jan. 5, 1926.

1,568,791

UNITED STATES PATENT OFFICE.

CHARLES W. AIKEN, OF BROOKLYN, NEW YORK.

SOAP DRIER.

Application filed July 21, 1923. Serial No. 652,925.

*To all whom it may concern:*

Be it known that I, CHARLES W. AIKEN, a citizen of the United States of America, residing at borough of Brooklyn, county of Kings, city and State of New York, have invented a new and useful Soap Drier, of which the following is a specification.

My invention relates to apparatus for drying material such as soap chips.

The main object is to provide reliable apparatus which can be made at a reasonable cost and which can be readily assembled, inspected and repaired and which will operate economically. Another object is to provide an apparatus of this character having a maximum capacity. Another object is to effectively and uniformly dry soap chips at a minimum expense.

In the drawings I have illustrated one form of apparatus for continuously mixing, drying and discharging soap chips according to my invention. The apparatus embodies a housing or casing containing conveyers for the chips so arranged and so constructed as to turn over and mix up the chips intermittently as they are conveyed. The air for drying the chips is forced or drawn through the casing back and forth over the conveyers and chips and heated while in the casing. Circulating means is also preferably provided for agitating the air adjacent the heater and some of the conveyers.

Fig. 1 is a side view illustrating apparatus embodying my invention, part of it being broken away and fore-shortened for convenience in illustration.

Fig. 2 is a transverse sectional view of the apparatus showing one of the circulating fans and illustrating by arrows the general movement of air through the casing.

Fig. 3 is an enlarged vertical sectional view showing a detail of the conveyer.

Fig. 4 is an edge view of a part of the conveyer.

Fig. 5 is a perspective view of one end of a conveyer pan.

Figs. 6 and 7 are vertical longitudinal sectional views showing the opposite ends of the apparatus.

Figure 7:
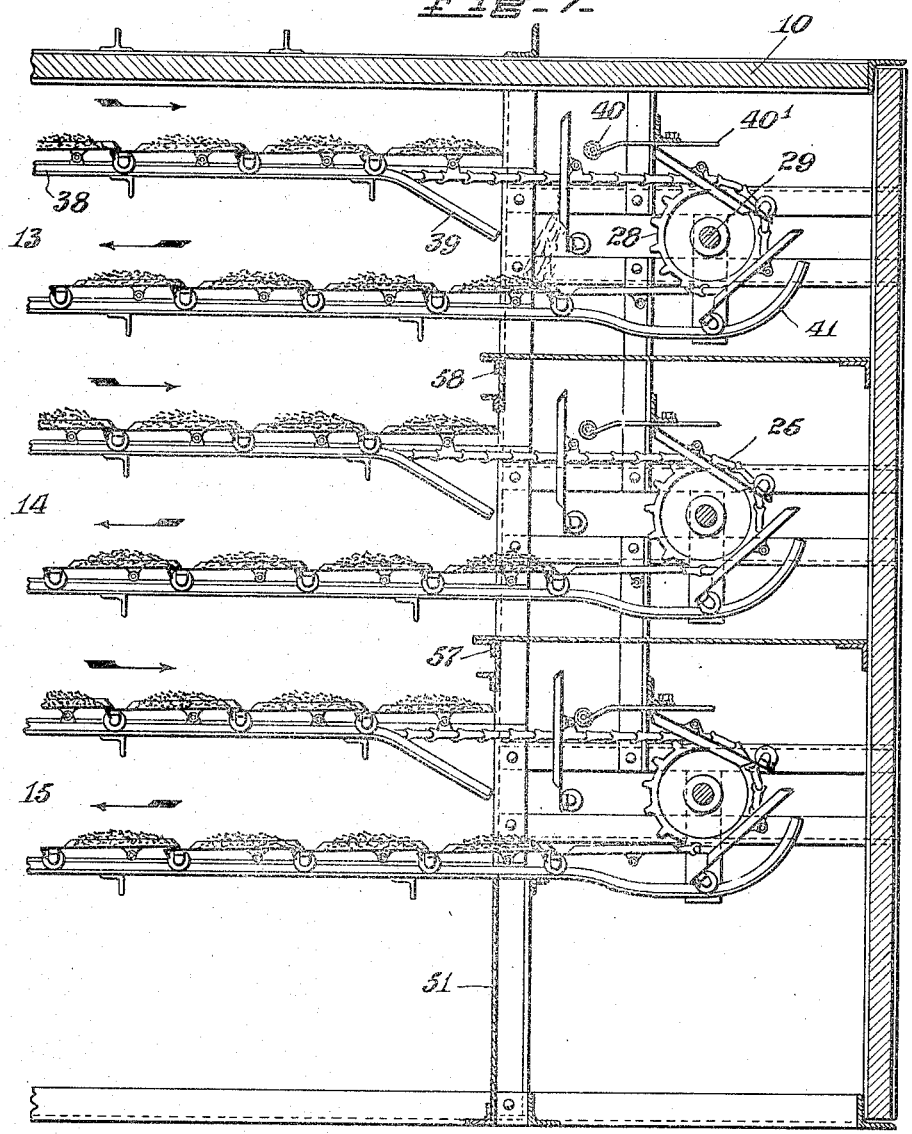

The casing 10 may be made in any suitable manner preferably of a series of sections arranged of sufficient length to provide the necessary capacity for the particular case required.

At one end of the casing is provided a hopper 11 or other suitable means for admitting the soap chips to the casing. The chips are conveyed to this hopper in any suitable manner, for instance by means of a belt or chain conveyor 12.

Inside the casing are arranged a plurality of conveyors, in this instance three, namely 13, 14 and 15, in vertical series. At the bottom of the casing is arranged a receiving trough 16 with a discharge member 17 for conveying the dried chips outside of the casing.

The air for drying the chips is admitted at one side of the casing through one or more openings such as 18—18 preferably arranged along the lower edges. The air is drawn out at the top through outlets such as 19—19 being aided for instance by means of a suction fan 20 which may handle the air from a plurality of outlets.

Within the casing along one side and preferably just above the air inlets 18—18 are arranged heating tubes preferably in two series such as 21 and 22. These tubes may be heated internally in any suitable manner such as by steam. Between the tubes are spaces for the circulation of air.

I also prefer to provide within the casing one or more circulating fans such as 23 arranged in a chamber above the heater tubes and adjacent the conveyors. Preferably one of these fans is provided to correspond with each of the outlets 19.

Figure 8:
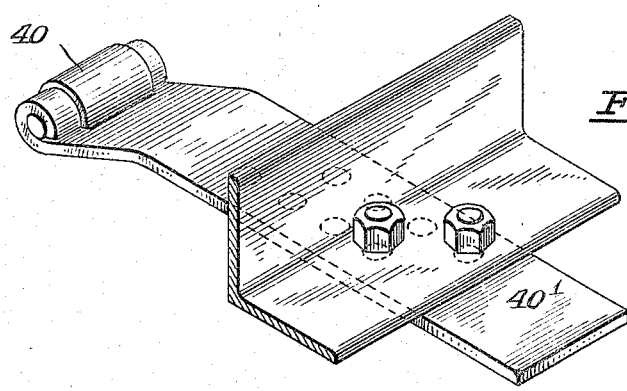
Fig. 8 is a perspective view of one of the pan tripping elements.

Each of the conveyors is made up of more or less conventional type of chains 25—25 running on sprockets 26—26 on shaft 27 at one end and on sprockets 28 on shaft 29 at the other end. One of the sprocket shafts is preferably adjustable back and forth, for instance by means of the take-up 30 (shown in Fig. 1) so as to permit the conveyor to be tightened up so as to operate satisfactorily. The soap chips are carried on perforated pans 31 which overlap each other as shown in Fig. 4. Each pan preferably has an upturned flange 32 at one edge and a downturned flange 33 at the other edge which reenforce the pans materially. Each pan also preferably has an end flange 34 which reenforces it and assists in holding the chips on the pan. Each pan has a pivot shaft 35 at its opposite ends suitably connected to the conveyor chains. These pivot shafts are arranged nearer one edge than the other and the pan is provided with rollers 36 at the edge most remote from the pivot shaft. Each roller may conveniently be carried by a bracket 37 secured to the underside of the pan and is adapted to travel on the track 38 which may conveniently be formed of angle iron so that the pans are supported in the position shown in Fig. 6 as they pass along the upper stretch of the conveyor. Near what may be termed the outer end of the casing, the ends 39 of the guide tracks 38 are inclined downwardly so that as each pan passes towards the right as viewed in Fig. 7 the rollers at its rear edge will ride down these inclines and the pans will hang vertically dumping the contents down on to the lower stretch of the conveyor. Immediately above the sprockets 28 I provide an abutment 40 which may be in the form of a roller which stands in the path of movement of the pans so as to tilt each pan as it comes along into the inclined position of the pan immediately above the path of the shaft 29 (Fig. 7) and thus be sure to jar the pan and dump all the chips. As soon as the edge of the pan clears the tailpiece 40' of the abutment member the pan will tilt back again so that its roller will engage the upwardly curved ends 41 of the lower guide tracks of the upper conveyor. The abutment member 40—40' may be adjustable back and forth as indicated in Fig. 8 or otherwise so as to insure that the pans will be dumped at the proper time. The opposite end of the lower track is inclined downwardly at 42 similarly to the incline 39 so that the lower stretch of the upper conveyor will dump the chips onto the upper stretch of the second conveyor as illustrated in Fig. 6. The corresponding end of the upper guide track 38 is provided with a curved portion 43 to receive the rollers of the pans and direct them into their proper paths. The conveyor 14 is constructed and operated in the same manner as the conveyor 13 and delivers its freight to the lower conveyor 15 which handles it in the same manner and deposits it into the receiving and discharging trough 16. In this way it will be noted that with three conveyors the material is turned over and mixed up five times after it is deposited on the upper conveyor and before it is discharged. This insures a complete mixing of the chips so that all portions are equally uniformly dried.

The casing is provided with partitions and deflecting plates so as in conjunction with the conveyor pans to cause a maximum circulation of air along more or less definite channels as indicated by the arrows in Figure 2, for instance a partition 45 is provided beneath the heating tubes which directs the air beneath these tubes and to the opposite side of the casing beneath the lower conveyer pans. I also provide a deflecting plate 46 to, so far as practical, prevent air from this portion of the conduit passing directly to the heater tubes. The air which passes beneath the lower portion of the lower conveyer is allowed to travel backward between the upper and lower stretches of the lower conveyer being deflected by the plate 47, thus cooling the material and heating the air. The air thus passes through the lower conveyer and around heating tubes since it is prevented from passing directly backward between the conveyers by the interposed baffle plate 48. The air from the heater tubes is then directed back through the space above the upper stretch of the lower conveyer and the upper stretch of the second conveyer by means of a baffle plate or partition 49. The air then passes upward around the edge of the conveyer 14 and is allowed to pass backward over the upper stretch of the second conveyer and through and over the upper conveyer to the circulating fan 23 which keeps the air moving and forces some of it back and downward through the heater tubes 21 and thence through the tubes 22 to mingle in with the air which is coming to these tubes 22 directly from the lower conveyer conduit. It should be noted that the cross sectional area of the conduit increases as the air becomes heated and laden with the evaporated moisture. I prefer to provide vertical transverse partitions or baffles as shown in Figs. 6 and 7 so as to confine the definite circulation of air to those portions of the conveyers which are loaded. Such transverse partitions are shown at 50 and 51 beneath the lower conveyer, 52, 53 and 54 within the respective conveyers at the left, at 55 and 56 between the conveyers at the left, 57 and 58 between the conveyers at the right and at 59 above the top conveyer at the left. It should be understood of course that these deflecting baffles or partitions are not intended to confine all of the air but merely to direct most of the air as above indicated so as to utilize the maximum heating and drying effect.

In the particular arrangement shown the air passing to the left as viewed in Figure 2 between the upper and lower stretches of the lower conveyer has approximately one half the cross sectional conduit space as the air passing to the right between the upper stretch of the lower conveyer and the upper stretch of the second conveyer and approximately one third of the cross sectional area of the upper conduit portion between the upper stretch of the second conveyer and the top of the casing. It should be understood, however, that I do not consider these proportions essential to the attainment of many of the advantages of my invention.

It should also be understood that I do not consider the exact construction and circulation herein shown to be essential except so far as I have limited certain claims thereto.

I claim:

1. In a soap drier, a casing having a plurality of movable conveyers arranged in vertical series with air inlets along the lower edge and air outlets along the upper edge, heating means arranged along one side near the bottom, and circulating means arranged above the heating means.

2. In a soap drier, a casing having inlet means for the soap chips at the top and discharge means at the bottom, movable conveyers arranged in the casing between the inlet and the discharge means, a heater arranged along one side of the casing with baffle plates above and below the same, means for admitting air beneath the heater and deflecting it through the lower part of the conveyer and through the heater, circulating means within the casing adjacent the upper part of the conveyer and means for drawing air through the casing.

3. In a soap drier, a casing, three movable conveyers arranged therein in vertical series with circulating channels through and between the conveyers, a heater arranged along side the lower conveyer, means for directing air through the lower conveyer and through the heater and back through the space between the lower conveyer and the conveyer immediately above the same and through said latter conveyer, and deflecting means for causing the air to circulate back across the upper part of said latter conveyer and through and above the upper conveyer.

4. In a soap drier, a casing having air inlets along the lower edge and air outlets along the upper edge, heating means arranged along one side near the bottom, air circulating means arranged above the heating means, a plurality of movable conveyers arranged in vertical series, and separate means for withdrawing moist air from the casing.

5. In a soap drier, a casing having inlet means for the soap chips at the top and discharge means at the bottom, movable conveyers arranged in the casing between the inlet and the discharge means, a heater arranged along one side of the casing with baffle plates above one side of and below the heater, means for admitting air beneath the heater and deflecting it through the lower part of the conveyer and through one side of the heater, circulating means within the casing above the heater and adjacent the upper part of the conveyer and means for drawing air through the casing.

6. In a soap drier, a casing, three movable conveyers arranged therein in vertical series with circulating channels through and between the conveyers, a heater arranged alongside the lower conveyer and the space between the lower conveyer and the one above it, means for directing air through the lower conveyer and through the heater and back through the space between the lower conveyer and the conveyer immediately above the same and through said latter conveyer and means for deflecting the air back across the upper part of said latter conveyer and through and above the upper conveyer, a fan for stirring the air within the casing and means for withdrawing the air from the casing.

7. A soap drier comprising a casing having air inlets and outlets, a heater arranged in two parts, conveyor mechanism arranged in three parts, partitions arranged in said casing to permit air to circulate directly between one part of the heater and two parts of the conveyer mechanism, a fan arranged to directly circulate air from the other conveyer part to the other heater part, and means for withdrawing air from the casing.

CHARLES W. AIKEN.